US010230709B1

(12) United States Patent
Kanakarajan

(10) Patent No.: US 10,230,709 B1
(45) Date of Patent: Mar. 12, 2019

(54) METHOD, SYSTEM, AND APPARATUS FOR DELEGATING CONTROL OVER THE CONFIGURATION OF MULTI-TENANT NETWORK DEVICES

(71) Applicant: Juniper Networks, Inc., Sunnyvale, CA (US)

(72) Inventor: Ravindranath C. Kanakarajan, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 229 days.

(21) Appl. No.: 15/197,756

(22) Filed: Jun. 30, 2016

(51) Int. Cl.
*H04L 29/06* (2006.01)
*H04L 12/24* (2006.01)
*H04L 12/713* (2013.01)

(52) U.S. Cl.
CPC .............. *H04L 63/08* (2013.01); *H04L 41/04* (2013.01); *H04L 41/0816* (2013.01); *H04L 41/5051* (2013.01); *H04L 45/586* (2013.01); *H04L 63/10* (2013.01)

(58) Field of Classification Search
CPC . H04L 12/4641; H04L 63/0272; H04L 63/20; H04L 45/586; H04L 41/08; H04L 41/04; H04L 41/0816; H04L 41/5051; H04L 63/10; H04L 63/08
See application file for complete search history.

(56) References Cited

U.S. PATENT DOCUMENTS

| 9,465,668 B1 * | 10/2016 | Roskind ................ G06F 9/5072 |
| 9,565,190 B1 * | 2/2017 | Telvik ................ H04L 63/0884 |
| 2008/0127316 A1 * | 5/2008 | Golan ................ H04L 12/2856 726/5 |
| 2017/0318055 A1 * | 11/2017 | Popuri .................... H04L 63/20 |

* cited by examiner

*Primary Examiner* — Christopher C Harris
(74) *Attorney, Agent, or Firm* — FisherBroyles, LLP

(57) ABSTRACT

The disclosed apparatus may include (1) providing a framework that enables a customer entity of a service provider to configure, via a customer portal, a network device of the service provider that directs network traffic of the customer entity, (2) creating, for the customer entity by way of the framework, a virtual network that includes at least a portion of the network device of the service provider, (3) detecting an attempt by the customer entity to configure at least a portion of the virtual network via the customer portal, and then in response to detecting the attempt by the customer entity, (4) performing a configuration operation that configures the portion of the virtual network as directed by the customer entity via the customer portal. Various other apparatuses, systems, and methods are also disclosed.

14 Claims, 7 Drawing Sheets

```
Example Code
    400

************************************************ interfaces {
        ge-x/y/z {
                unit i {
                        encap <>
                }
            }
        }
routing-instances {
        coke_vrf {
                                instance-type vrf;
                                interface ge-x/yz/.i;
                                vrf-target target:64512:10000;
                                        routing-options {
                                                static {
                                                        route 192.0.0/8 next-hop ge-x/y/z.i;
                                                        route 0.0.0.0/0 next-hop ge-x/y/z.i;
                                                }
                                        }
                        }
                }
************************************************
```

*FIG. 4*

Example Code
500

```
interfaces {
        ge-x/y/z {
                unit i {
                        encap <>
                }
            }
        }
routing-instances {
        coke_vrf {
                        instance-type vrf;
                        interface ge-x/yz/.i;
                        vrf-target target:64512:10000;
                                forwarding-options {
                                        family family-name {
                                                filter {
                                                        input filter-tcp-port-based;
                                                }
                                        }
                                }
                }
            }
```

FIG. 5

```
                         Example Code
                              600

------------------------------------------------------------------
********************************************** interfaces {
        ownership {
                tenant cloud-admin;
                rbac {
                        'admin' : 'rwx',
                        'others':'r—'
                    }
                }
        ge-x/y/z {
                unit i {
                        encap <>
                    }
                }
            }
routing-instances {
        ownership {
                tenant cloud-admin;
                rback {
                        'admin' : 'rwx',
                        'others' : 'r—'
                    }
                }
            public {
                instance-type vrf;
                interface ge-x/yz/.i;
                vrf-target target:64512:10000;
                        routing-options {
                                ownership {
                                        tenant 'coke';
                                                rbac {
                                                        'customer-admin'rwx',
                                                        'others':'r—'
                                                    }
                                            }
                                        static {
                                                route 0.0.0.0/0 next-hop ge-x/y/z.i;
                                            }
                                        }
                                    }
                            }
                    }

METHOD, SYSTEM, AND APPARATUS FOR DELEGATING CONTROL OVER THE CONFIGURATION OF MULTI-TENANT NETWORK DEVICES

BACKGROUND

Network devices (such as routers) are often used to facilitate the flow of traffic within computer networks. For example, a service provider may have various multi-tenant routers that send and/or receive network traffic in connection with various customers. In one example, the service provider may have a multi-tenant router that services network traffic on behalf of a first customer and a second customer. Unfortunately, the service provider may be responsible for and/or in charge of making certain changes to the configuration of this multi-tenant router to accommodate the individual needs of the customers.

Accordingly, as the number of customers increases, so too does the number of configuration changes that are made to the service provider's routers. These configuration changes may necessitate and/or call for additional resources from the service provider. For example, the service provider may employ various network administrators that are responsible for and/or in charge of manually entering configuration changes into the service provider's routers at the customers' request. In this example, the service provider may have to increase its workforce to keep up with customer demand for configuration changes.

Moreover, conventional multi-tenant routers may be unable to support configuration changes that are made by the customers themselves without introducing certain security risks and/or vulnerabilities into the service provider's network. For example, a conventional multi-tenant router may have certain access-control parameters and/or permissions that are too coarse for delegation to the service provider's network. In the event that the service provider delegates control over the configuration of the conventional multi-tenant router to a customer, that customer may be able to modify (whether intentionally or accidentally) the network characteristics of another customer's traffic. As a result, such conventional delegation may introduce some significant security and/or privacy concerns.

The instant disclosure, therefore, identifies and addresses a need for improved and/or additional methods, systems, and apparatuses for delegating control over the configuration of multi-tenant network devices such that customers of service providers are able to directly modify the configuration with increased agility and/or quicker turnaround times.

SUMMARY

As will be described in greater detail below, the instant disclosure generally relates to methods, systems, and apparatuses for delegating control over the configuration of multi-tenant network devices. In one example, a method for accomplishing such a task may include (1) providing a framework that enables a customer entity of a service provider to configure, via a customer portal, a network device of the service provider that directs network traffic of the customer entity, (2) creating, for the customer entity by way of the framework, a virtual network that includes at least a portion of the network device of the service provider, (3) detecting an attempt by the customer entity to configure at least a portion of the virtual network via the customer portal, and then in response to detecting the attempt by the customer entity, (4) performing a configuration operation that configures the portion of the virtual network as directed by the customer entity via the customer portal.

Similarly, a system for performing the above-described method may include various modules stored in memory, such as (1) a framework module that provides a framework that enables a customer entity of a service provider to configure, via a customer portal, a network device of the service provider that directs network traffic of the customer entity, (2) a virtualization module that creates, for the customer entity by way of the framework, a virtual network that includes at least a portion of the network device of the service provider, (3) a portal module that detects an attempt by the customer entity to configure at least a portion of the virtual network via the customer portal, (4) a configuration module that performs, in response to the detection of the attempt by the customer entity, a configuration operation that configures the portion of the virtual network as directed by the customer entity via the customer portal, and (5) at least one physical processor that executes the framework module, the virtualization module, the portal module, and the configuration module.

An apparatus for performing the above-described method may include (1) a storage device that stores a framework that enables a customer entity of a service provider to configure, via a customer portal, a network device of the service provider that directs network traffic of the customer entity and (2) at least one physical processor communicatively coupled to the storage device, wherein the physical processor (A) creates, for the customer entity by way of the framework, a virtual network that includes at least a portion of the network device of the service provider, (B) detects an attempt by the customer entity to configure at least a portion of the virtual network via the customer portal, and then (C) performs, in response to detecting the attempt by the customer entity, a configuration operation that configures the portion of the virtual network as directed by the customer entity via the customer portal.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is an illustration of example code that facilitates delegating control over the configuration of multi-tenant network devices.

FIG. 5 is an illustration of example code that facilitates delegating control over the configuration of multi-tenant network devices.

FIG. 6 is an illustration of example code that facilitates delegating control over the configuration of multi-tenant network devices.

Figure 1:
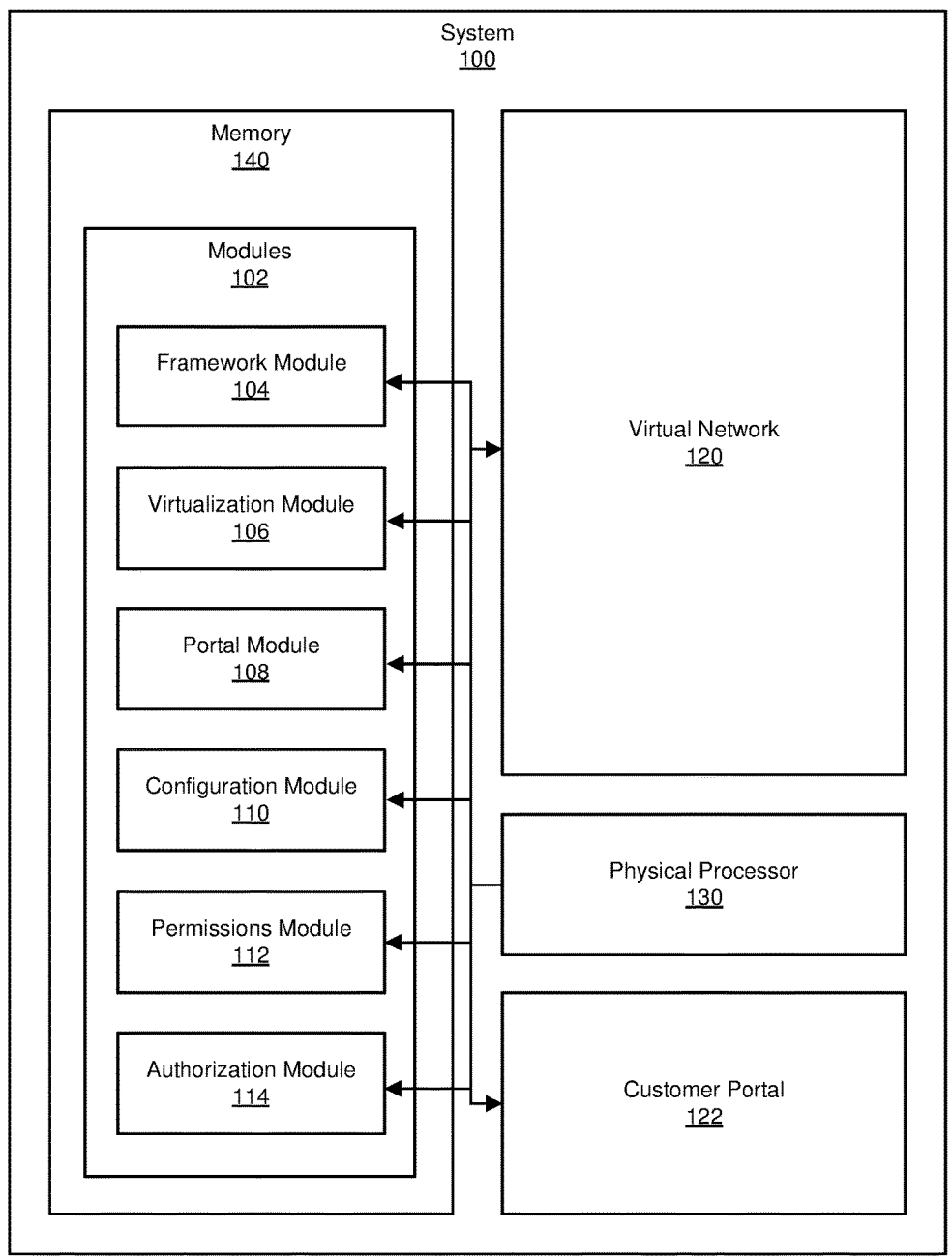
FIG. 1 is a block diagram of an exemplary apparatus for delegating control over the configuration of multi-tenant network devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for delegating control over the configuration of multi-tenant network devices. As will be explained in greater detail below, embodiments of the instant disclosure may enable customers of a service provider to access and/or control the configuration of certain portions of multi-tenant network devices that direct network traffic in connection with those customers. Additionally or alternatively, embodiments of the instant disclosure may prevent and/or block customers of a service provider from modifying the configuration of any portions of multi-tenant network devices that direct network traffic in connection with other customers.

As a result, the service provider may be able to mitigate and/or eliminate the need for human intervention in making customer-initiated configuration changes to multi-tenant network devices even in the face of increases in the number of customers. Additionally or alternatively, the service provider may be able to trust and/or ensure that its customers cannot modify (whether intentionally or accidentally) the network characteristics of one another's traffic and/or steal one another's traffic. Embodiments of the instant disclosure may thus potentially reduce the service provider's operating costs while ensuring the security, privacy, and/or reliability of its customers' network traffic.

Figure 2:
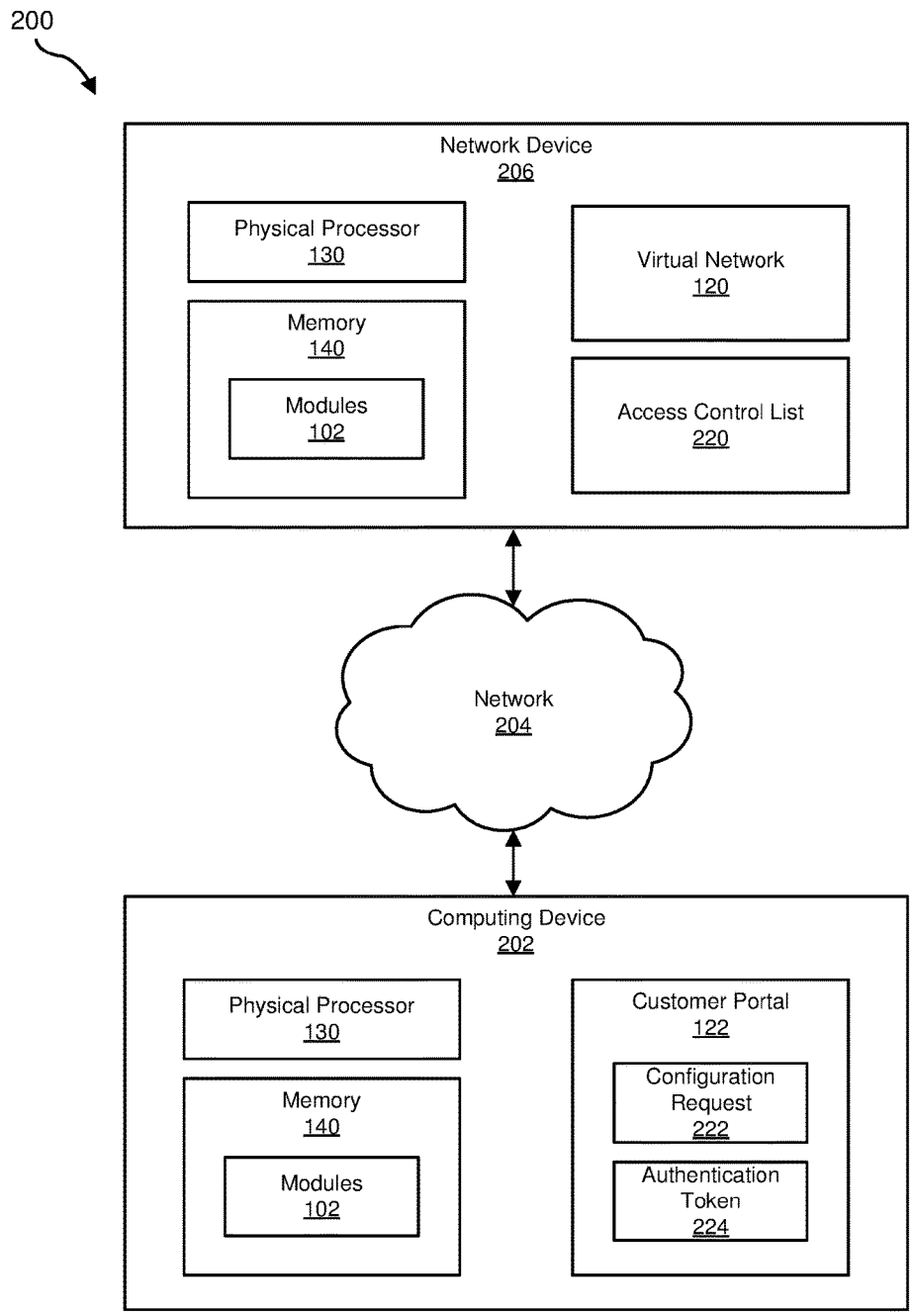
FIG. 2 is a block diagram of an exemplary apparatus for delegating control over the configuration of multi-tenant network devices.

The following will provide, with reference to FIGS. 1 and 2, examples of systems and/or apparatuses that facilitate delegating control over the configuration of multi-tenant network devices. The discussion corresponding to FIG. 3 will provide a detailed description of an exemplary method for delegating control over the configuration of multi-tenant network devices. The discussion corresponding to FIGS. 4-6 will provide a detailed description of various example code that facilitates delegating control over the configuration of multi-tenant network devices. Finally, the discussion corresponding to FIG. 7 will provide numerous examples of systems that may include the components shown in FIGS. 1 and 2.

FIG. 1 is a block diagram of an exemplary system 100 for delegating control over the configuration of multi-tenant network devices. As illustrated in this figure, exemplary system 100 may include one or more modules 102 for performing one or more tasks. As will be explained in greater detail below, modules 102 may include a framework module 104, a virtualization module 106, a portal module 108, a configuration module 110, a permissions module 112, and an authentication module 114. Although illustrated as separate elements, one or more of modules 102 in FIG. 1 may represent portions of a single module, application, and/or framework.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 1 (e.g., computing device 202 and/or network device 206). One or more of modules 102 in FIG. 1 may also represent all or portions of one or more special-purpose computers configured to perform one or more tasks.

As illustrated in FIG. 1, exemplary system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, exemplary system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate delegating control over the configuration of multi-tenant network devices. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, exemplary system 100 may also include one or more virtual networks, such as virtual network 120. The term "virtual network," as used herein, generally refers to any type or form of section and/or partition of a network that is isolated from another section and/or partition of the same. In one example, virtual network 120 may include and/or represent a section and/or partition of a network that is dedicated to servicing network traffic for a particular customer of a service provider. In this example, virtual network 120 may be separate and/or distinct from another virtual network that is dedicated to servicing network traffic for another customer of the service provider within the service provider's network. Examples of virtual network 120 include, without limitation, subnets, Virtual Routing and Forwarding (VRF) instances, physical and/or virtual ports on network devices, configlets on network devices, a collection of one or more of the same, portions of one or more of the same, variations or combinations of one or more of the same, and/or any other suitable virtual network.

As illustrated in FIG. 1, exemplary system 100 may also include one or more customer portals, such as customer portal 122. The term "customer portal," as used herein, generally refers to any type or form of user interface that enables a customer of a service provider to access, modify, and/or configure at least a portion of a network device of the service provider. In one example, customer portal 122 may include and/or represent a graphical user interface and/or a command-line interface that enables a customer of a service provider to configure at least a portion of a service provider's network device remotely via a network. Additional examples of customer portal 122 include, without limitation, web-based interfaces, cloud-based interfaces, menu-driven interfaces, form-based interfaces, natural-language interfaces, portions of one or more of the same, variations or combinations of one or more of the same, and/or any other suitable customer portals.

Exemplary system 100 in FIG. 1 may be implemented in a variety of ways and/or contexts. For example, all or a portion of exemplary system 100 may represent portions of exemplary system 200 in FIG. 2. As shown in FIG. 2, system 200 may include a computing device 202 and a network device 206 in communication with one another via a network 204. In some embodiments, system 200 may include various other devices and/or components that are not necessarily illustrated in FIG. 2. Although FIG. 2 illustrates network device 206 and computing device 202 as being external to network 204, network device 206 and/or computing device 202 may alternatively represent a part of and/or be included in network 204.

In one example, all or a portion of the functionality of modules 102 may be performed by network device 206, computing device 202, and/or any other suitable computing device (whether or not illustrated in FIG. 2). As will be described in greater detail below, one or more of modules 102 from FIG. 1 may, when executed by at least one processor of network device 206 and/or computing device 202, enable network device 206 and/or computing device 202 to delegate control over the configuration of multi-tenant network devices.

In one example, network device 206 may be programmed with one or more of modules 102 that are stored in memory 140 and/or executable by physical processor 130. In this example, network device 206 may include and/or represent at least a portion of virtual network 120 that facilitates the flow of network traffic for a particular customer of a service provider. Additionally or alternatively, network device 206 may include and/or maintain an access control list 220.

In one example, computing device 202 may be programmed with one or more of modules 102 that are stored in memory 140 and/or executable by physical processor 130. In this example, computing device 202 may execute customer portal 122 and/or present the same to the customer of the service provider. Customer portal 122 may generate a configuration request 222 that identifies a portion of virtual network 120 to be configured as directed by the customer. Additionally or alternatively, customer portal 122 may generate an authentication token 224 that includes identification information that identifies the customer that initiated configuration request 222.

Computing device 202 generally represents any type or form of computing device capable of reading computer-executable instructions. In one example, computing device 202 may include and/or represent a client device operated by an administrator employed by a customer of a service provider. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, storage systems, variations or combinations of one or more of the same, and/or any other suitable computing devices.

Network device 206 generally represents any type or form of computing system, device, and/or mechanism that facilitates the flow of network traffic within a service provider's network. In one example, network device 206 may include and/or represent a multi-tenant router that services network traffic for multiple customers of a service provider. Additional examples of network device 206 include, without limitation, routers, switches, hubs, modems, bridges, repeaters, gateways, multiplexers, network adapters, network racks, chasses, servers, computing devices, multi-tenant network devices, portions of one or more of the same, variations or combinations of one or more of the same, and/or any other suitable network device. Although illustrated as a single entity in FIG. 2, network device 206 may include and/or represent a plurality of network devices.

Figure 3:
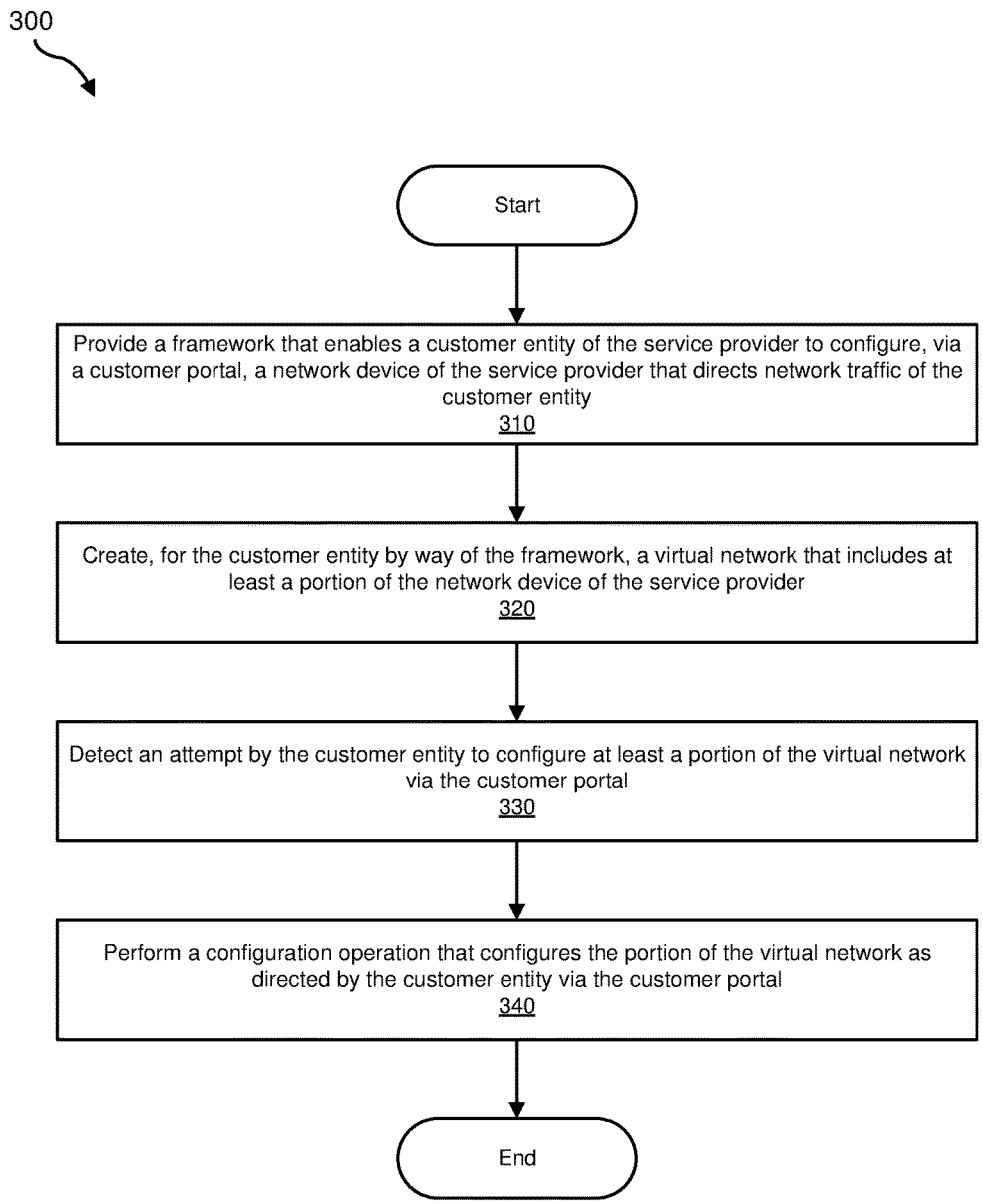
FIG. 3 is a flow diagram of an exemplary method for delegating control over the configuration of multi-tenant network devices.

FIG. 3 is a flow diagram of an example computer-implemented method 300 for delegating control over the configuration of multi-tenant network devices. The steps shown in FIG. 3 may be performed by any suitable computer-executable code and/or computing system, including system 100 in FIG. 1, system 700 in FIG. 7, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may provide a framework that enables a customer entity of a service provider to configure, via a customer portal, a network device of the service provider that directs network traffic of the customer entity. For example, framework module 104 may, as part of network device 206 and/or computing device 202, provide a framework that enables a customer entity of a service provider to configure network device 206 via customer portal 122. The term "framework," as used herein, generally refers to any type or form of computing tool and/or application that enables customers of a service provider to remotely configure certain portions of the service provider's network devices. In this example, the framework may include and/or represent certain programs, compilers, code libraries, toolsets, plug-ins, clients, software agents, and/or Application Programming Interfaces (APIs) that facilitate remote configuration changes on network device 206.

The terms "customer," "customer entity," and "tenant," as used herein, generally refer to any person, organization, company, and/or business that subscribes to and/or receives certain computing services from a service provider. In one example, a customer may include and/or represent a company that receives Internet service from an Internet service provider (such as COMCAST, AT&T, TIME WARNER CABLE, CENTURYLINK, VERIZON, and/or CHARTER COMMUNICATIONS).

The systems described herein may perform step 310 in a variety of ways and/or contexts. In some examples, framework module 104 may provide the framework by distributing the framework to network device 206 and/or computing device 202. Additionally or alternatively, framework module 104 may provide the framework by installing the framework on network device 206 and/or computing device 202. Upon installation of the framework, a representative and/or employee of the customer entity may access the framework via customer portal 122 on computing device 202. By accessing the framework in this way, the representative and/or employee of the customer entity may be able to modify, configure, and/or reconfigure certain portions (such as VRF instances, routing instances, configlets, the network operating system, a management daemon, a virtual network function manager, resources, and/or objects) of network device 206.

In some examples, framework module 104 and/or the framework itself may enable the service provider to delegate control over at least a portion of network device 206 and/or virtual network 120 to the customer entity. By delegating control in this way, framework module 104 and/or the framework itself may alleviate the burden placed on the service provider to make configuration changes to network device 206 and/or virtual network 120 at the customer's request. As a result, framework module 104 and/or the framework itself may potentially reduce the service provider's operating costs while ensuring the security, privacy, and/or reliability of its customer's network traffic.

Returning to FIG. 3, at step 320 one or more of the systems described herein may create, for the customer entity by way of the framework, a virtual network that includes at least a portion of the network device of the service provider. For example, virtualization module 106 may, as part of network device 206 and/or computing device 202, create virtual network 120 that includes at least a portion of network device 206. In this example, the portion of network device 206 within virtual network 120 may include and/or represent one or more physical and/or virtual communication ports and/or network links.

The systems described herein may perform step 320 in a variety of ways and/or contexts. In some examples, virtualization module 106 may create virtual network 120 by partitioning groups of communication ports and/or network links on network device 206 for different customers of the service provider. For example, virtualization module 106 may designate and/or assign certain communication ports and/or network links on network device 206 to one customer of the service provider. As a result, these communication ports and/or network links may carry the network traffic for only that customer of the service provider.

Similarly, virtualization module 106 may designate and/or assign other communication ports and/or network links on network device 206 to another customer. As a result, these communication ports and/or network links may carry the network traffic for only that other customer of the service provider.

In some examples, virtualization module 106 may create virtual network 120 by subnetting network 204 such that one part of network device 206 is designated and/or assigned to one customer of the service provider and another part of network device 206 is designated and/or assigned to another customer of the service provider. For example, the service provider may have 4 different customers whose network traffic is routed and/or forwarded through network device 206. In this example, virtualization module 106 may subnet the communication ports and/or network links on network device 206 for each of those 4 different customers. As a result, one of the subnets may carry network traffic for one of the customers, and another one of the subnets may carry network traffic for another one of the customers, and so on.

Returning to FIG. 3, at step 330 one or more of the systems described herein may detect an attempt by the customer entity to configure at least a portion of the virtual network via the customer portal. For example, portal module 108 may, as part of network device 206 and/or computing device 202, detect an attempt by the customer entity to configure at least a portion of virtual network 120 via customer portal 122. In this example, the attempt by the customer entity may involve a configuration request that identifies the portion of virtual network 120 to be configured. The phrase "to configure," as used herein, generally refers to any process and/or procedure that modifies and/or changes the configuration of at least a portion of a virtual network in one way or another.

The systems described herein may perform step 330 in a variety of ways and/or contexts. In some examples, portal module 108 may detect the attempt by the customer entity by receiving configuration request 222 from the customer entity via customer portal 122. In such examples, configuration request 222 may identify the portion of virtual network 120 to be configured and/or reconfigured. Examples of portions of virtual network 120 that may be configured and/or reconfigured include, without limitation, VRF instances, portions of a network operating system, a management daemon, a virtual network function manager, routing instances, configlets of a network device, resources, and/or objects, variations or combinations of one or more of the same, and/or any other suitable components of a virtual network and/or network device.

In some examples, portal module 108 may also receive authentication token 224 from the customer entity via customer portal 122. In one example, authentication token 224 may include identification information that identifies the customer entity and/or facilitates proving the identity of the customer entity. For example, authentication module 114 may, as part of network device 206 and/or computing device 202, authenticate the customer entity based at least in part on user credentials. In this example, authentication module 114 may obtain user credentials from the customer entity via customer portal 122.

Upon obtaining the user credentials, authentication module 114 may confirm that the user credentials correspond to reference credentials stored in connection with virtual network 120. Authentication module 114 may then provide computing device 202 and/or the customer entity with authentication token 224 that includes identification information that identifies the customer entity and/or facilitates proving the identity of the customer entity. Authentication token 224 may accompany configuration requests that are initiated by computing device 202 and/or the customer entity and intended to cause network device 206 to configure and/or reconfigure any portion of virtual network 120.

As a specific example, an administrator employed by the customer may initiate configuration request 222 on computing device 202 via customer portal 122. In this example, configuration request 222 may direct network device 206 to configure and/or reconfigure a VRF instance and/or routing instance of virtual network 120. Upon initiating configuration request 222, computing device 202 may send configuration request 222 along with authentication token 224 to network device 206 via customer portal 122. In one example, authentication token 224 may represent part of and/or be included in configuration request 222. Additionally or alternatively, authentication token 224 may include and/or represent a component that is separate and/or distinct from configuration request 222 but accompanies configuration request 222 to network device 206.

As configuration request 222 and authentication token 224 arrive at network device 206, portal module 108 may detect and/or receive configuration request 222 and authentication token 224. Permissions module 112 may then determine that the customer entity has authorization to configure and/or reconfigure the portion of virtual network 120 based at least in part on authentication token 224. For example, permissions module 112 may compare the identification information included in authentication token 224 with the identity of the owner of virtual network 120. In other words, permissions module 112 may check whether configuration request 222 originated from the customer entity who owns virtual network 120 and/or to whom virtual network 120 belongs or has been designated and/or assigned.

In the event that authentication token 224 identifies configuration request 222 as originating from the customer entity who owns virtual network 120, permissions module 112 may direct configuration module 110 to configure and/or reconfigure the portion of virtual network 120 in accordance with configuration request 222. However, in the event that authentication token 224 identifies configuration request 222 as originating from any other entity (such as another customer of the service provider who does not own virtual network 120), permissions module 112 may direct configuration module 110 to ignore and/or disregard configuration request 222. In other words, permissions module 112 may essentially block configuration request 222 and/or ensure that configuration module 110 does not satisfy configuration request 222.

In one example, the identification information included in authentication token 224 may identify the role of the user who initiated configuration request 222 on the customer's behalf. For example, an administrator of the customer entity may initiate configuration request 222. In this example, authentication token 224 that accompanies configuration request 222 may identify the administrator and/or his or her role as administrator for the customer entity. Different roles may have different permissions that dictate whether a particular user is able to access and/or configure certain portions of virtual network 120. Permissions module 112 may compare the role of the user against access control list 220 of virtual network 120. Permissions module 112 may then determine that access control list 220 identifies the role of administrator as being authorized to configure the portion of virtual network 120 identified in configuration request 222.

Since, in this example, the user who initiated configuration request 222 is an administrator of the customer entity, his or her permissions level may grant and/or confer the ability to access and/or configure the portion of virtual network 120 identified in configuration request 222 on behalf of the customer entity. However, in the event that the user who initiated configuration request 222 is a less authorized representative of the customer entity, his or her permissions may fail to reach the level necessary to access and/or configure the portion of virtual network 120 identified in configuration request 222. As a result, permissions module 112 may direct configuration module 110 to ignore and/or disregard configuration request 222. In other words, permissions module 112 may essentially block configuration request 222 and/or ensure that configuration module 110 does not satisfy configuration request 222.

In one example, portal module 108 may detect an attempt by the customer entity to configure another portion of network device 206. For example, portal module 108 may receive a configuration request from the customer entity via customer portal 122. In this example, permissions module 112 may determine that the customer entity does not have authorization to configure this other portion of network device 206 identified in the configuration request. As a result, permissions module 112 may direct configuration module 110 to ignore and/or disregard this configuration request. In other words, permissions module 112 may essentially block this configuration request and/or ensure that configuration module 110 does not satisfy this configuration request.

In one example, permissions module 112 and/or authentication module 114 may enable the customer entity to delegate authorization to configure virtual network 120 to at least one user. For example, the customer entity and/or its administrator may delegate authorization to configure certain portions of virtual network 120 to other employees. Additionally or alternatively, the customer entity and/or its administrator may delegate authorization to configure certain portions of virtual network 120 to third parties outside of the customer entity. Such delegation may continue on recursively from one authorized user to another, thereby creating certain sub-levels of authorization.

After the customer entity has delegated such authorization to the user, portal module 108 may detect an attempt by the user to configure at least a portion of virtual network 120 via customer portal 122. For example, portal module 108 may receive a configuration request via customer portal 122 from a computing device (not necessarily illustrated in FIG. 2) operated by the user. In this example, permissions module 112 may determine that the user who initiated this configuration request has authorization to configure the portion of virtual network 120 identified in the configuration request. As a result, permissions module 112 may direct configuration module 110 to configure the portion of virtual network 120 in accordance with the configuration request.

Returning to FIG. 3, at step 340 one or more of the systems described herein may perform a configuration operation that configures the portion of the virtual network as directed by the customer entity via the customer portal. For example, configuration module 110 may, as part of network device 206 and/or computing device 202, perform a configuration operation that configures the portion of virtual network 120 as directed by the customer entity via customer portal 122. In this example, configuration module 110 may initiate performance of the configuration operation in response to the detection of the attempt by the customer entity. Configuration module 110 may refrain from configuring any portion of network device 206 that is excluded from virtual network 120 and/or belongs to a different customer.

The systems described herein may perform step 340 in a variety of ways and/or contexts. In some examples, configuration module 110 may perform the configuration operation by applying certain configuration changes identified in configuration request 222 to network device 206 and/or virtual network 120. For example, the service provider may initially configure a VRF instance for the customer entity at network device 206. In this example, the VRF instance may serve as and/or represent a logical interface into which the customer's traffic ingresses and/or from which the customer's traffic egresses. Accordingly, network device 206 may steer and/or direct that customer's traffic to the VRF instance.

Once the VRF instance has been created, all of that customer's traffic may travel to and/or traverse that VRF instance. Since, in this example, the service provider has delegated control over the VRF instance to the customer entity, the administrator of the customer entity may modify and/or reconfigure the VRF instance remotely from computing device 202. For example, the administrator of the customer entity may modify the computer-executable code that creates and/or defines the VRF instance.

In one example, the service provider may initially set up a VRF instance for the customer entity at network device 206 using some default code. In this example, the customer entity may modify and/or reconfigure the VRF to account for multiple virtual service instances by adding certain lines to the default code, thereby resulting in example code 400 in FIG. 4. For example, the customer entity may add the routing options listed in example code 400 in FIG. 4 to the default code. These routing options may enable and/or cause example code 400 in FIG. 4 to facilitate and/or create the multiple virtual service instances for the customer entity within the VRF. As a result, network device 206 may steer and/or direct that customer's traffic to some or all of those virtual service instances within the VRF.

Continuing with this example, the service provider may be able to delegate control over only select portions of the VRF configuration while maintaining total control over other portions of the VRF configuration. For example, the service provider's administrator may delegate control over the "routing options" portion of the VRF configuration in example code 400 in FIG. 4. However, in this example, the service provider's administrator may maintain total control over the "instance-type vrf" portion, the "interface ge-x/yz/.i" portion, and the "vrf-target target:64512:10000" portion of the VRF configuration in example code 400 in FIG. 4. As a result, the customer's administrator may be able to modify and/or configure the "routing options" portion of the VRF configuration but not the "instance-type vrf," "interface ge-x/yz/.i," or "vrf-target target:64512:10000" portions of the VRF configuration.

In another example, the customer entity may modify and/or configure the VRF to filter out certain traffic at network device 206 by adding certain lines to the default code, thereby resulting in example code 500 in FIG. 5. For example, the customer entity may add the forwarding options listed in example code 500 in FIG. 5 to the default code. These forwarding options may enable and/or cause example code 500 in FIG. 5 to filter out certain traffic at network device 206 such that the filtered-out traffic does not enter the customer's network. As a result, network device 206 may drop any traffic that meets the description of the forwarding-table filter created within the VRF by way of the forwarding options.

Continuing with this example, example code 500 in FIG. 5 may enable multiple entities to modify and/or configure a certain portion of the VRF configuration. For example, both the customer's administrator and the service provider's administrator may be able to modify and/or configure the "family family-name" portion of the VRF configuration in example code 500 in FIG. 5. In one example, in addition to the customer's administrator and the service provider's administrator, a third-party delegate or customer employee who has been delegated authorization by the customer's administrator may be able to modify and/or configure the "family family-name" portion of the VRF configuration in example code 500 in FIG. 5.

In one example, the service provider may set up a VRF instance for the customer entity at network device 206 using example code 600 in FIG. 6. As illustrated in FIG. 6, example code 600 may define the owner of this VRF (in this example, "customer") and the role (in this example, "rwx") that is able to modify and/or configure this VRF. In addition, example code 600 may define the virtual service instance (in this example, "route 0.0.0.0/0 next-hop ge-x/y/z.i") of the VRF. Example code 600 may also define a forwarding-table filter for the VRF by way of certain forwarding options (not necessarily illustrated in FIG. 6).

In one example, customer portal 122 may be able to directly push configuration changes to network device 206 using cryptographic keys. These configuration changes may be applied to the VRF without necessitating any third-party authentication and/or token generation. For example, the service provider's administrator may create a VRF configuration for a customer and store certain customer information in connection with the VRF configuration. This customer information may include and/or represent a unique identifier for the customer, the customer's public key, and/or an initial sequence number for the VRF configuration.

Continuing with this example, when the customer attempts to modify the VRF configuration, computing device 202 operated by the customer may send new and/or updated code representative of the VRF configuration along with certain access information to network device 206. This access information may include and/or represent the unique identifier for the customer, a hash of the new and/or updated code that was created using the customer's private key, a new and/or updated sequence number for the updated VRF configuration, and/or (optionally) any ownership information about certain portions of the updated VRF configuration.

Upon receiving the new and/or updated code and/or the corresponding access information, network device 206 may verify the hash of the new and/or updated code using the customer's public key included in the customer information. In the event that the hash matches and the new and/or updated sequence number is greater than the initial sequence number included in the customer information, network device 206 may apply the new and/or updated code to the VRF configuration and/or replace the preexisting VRF configuration with the updated VRF configuration using the new and/or updated code. The sequence numbers may serve to protect against replay attacks by identifying different versions of the VRF configuration. In the event that no metadata is available for a particular resource and/or object targeted by the new and/or updated code, network device 206 may access and/or rely on the metadata of that resource's and/or object's parent to determine and/or enforce access permissions.

As explained above in connection with FIGS. 1-6, a framework may enable a service provider to delegate control over the configuration of multi-tenant network devices. For example, a service provider (such as AT&T and/or VERIZON) may provide a business Virtual Private Network (VPN) service to certain customers by way of virtual Customer Premises Equipment (vCPE). In this example, the service provider may deploy a physical router that steers and/or directs network traffic of those customers to their respective network service instances via VRFs. The service provider may create one VRF per customer and designate and/or assign each VRF to the corresponding customer.

By creating VRFs for its customers and/or designating and/or assigning the VRFs in this way, the service provider may effectively delegate control over the VRFs to the corresponding customers. For example, the service provider may assign ownership of each configlet on a router in the vCPE to a particular customer and then enforce access permissions accordingly. In addition, the customer who has ownership over a particular configlet may transfer and/or delegate certain access permissions and/or rights to additional users and/or third parties. Upon transferring and/or delegating such permissions and/or rights, the customer and the additional users and/or third parties may all be able to access and/or modify that configlet.

Ownership and/or access control may reside and/or be enforced at several different layers. For example, ownership and/or access control may reside and/or be enforced at the physical router. Additionally or alternatively, ownership and/or access control may reside and/or be enforced at a virtual network function manager, a configuration management micro-service, a cloud-based management service, and/or a network operating system management solution.

Figure 7:
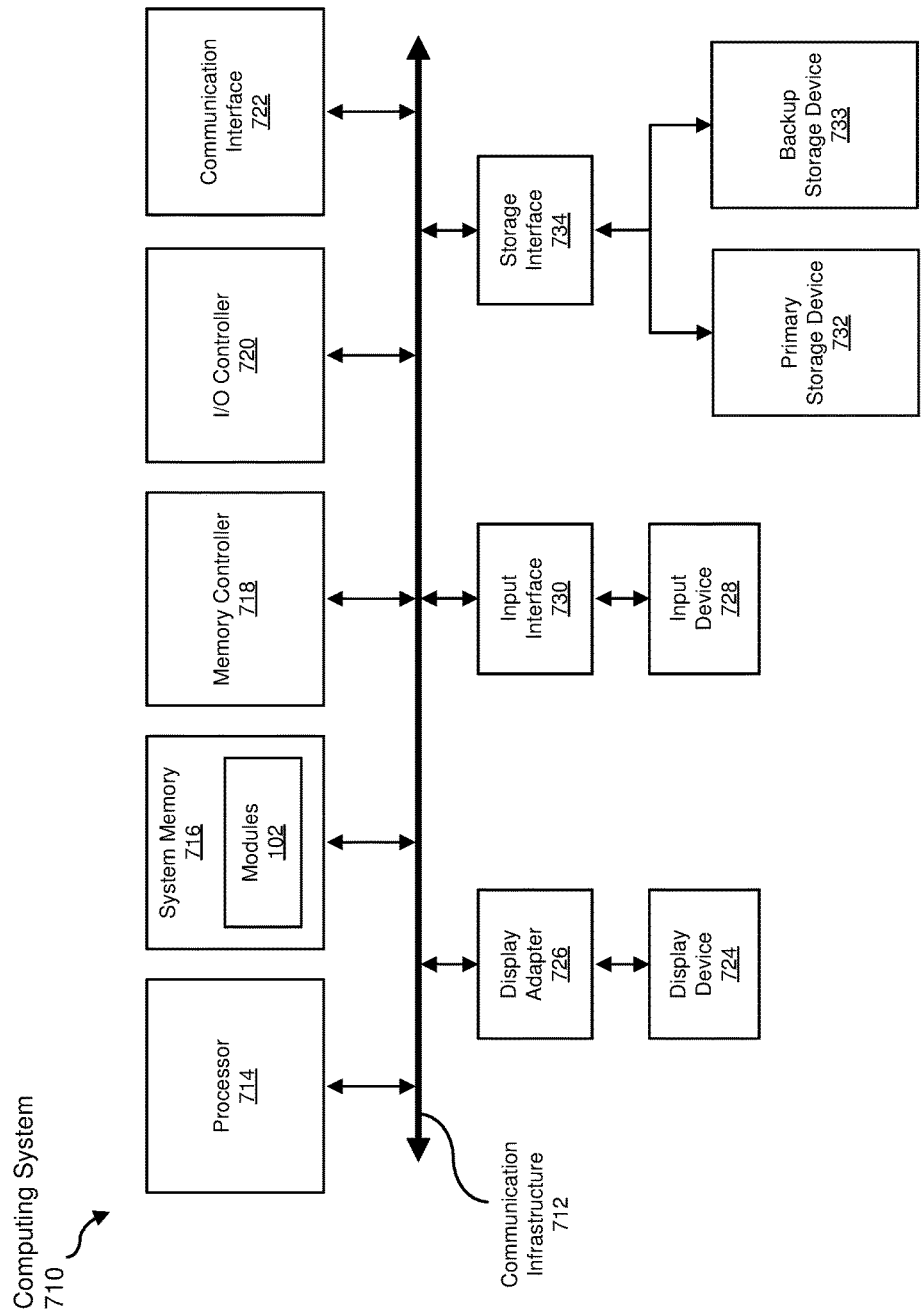
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 3. All or a portion of computing system 700 may also perform and/or be a means for performing and/or implementing any other steps, methods, or processes described and/or illustrated herein. In one example, computing system 700 may include and/or represent an apparatus that facilitates and/or performs delegation of control over the configuration of multi-tenant network devices.

Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. For example, processor 714 may represent an application-specific integrated circuit (ASIC), a system on a chip (e.g., a network processor), a hardware accelerator, a general purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   providing a framework that enables a customer entity of a service provider to configure, via a customer portal, a network device of the service provider that directs network traffic of the customer entity;
   creating, for the customer entity by way of the framework, a virtual network that includes at least a portion of the network device of the service provider;
   authenticating the customer entity by:
      obtaining at least one user credential from the customer entity via the customer portal;
      confirming that the user credential obtained from the customer entity corresponds to at least one reference credential stored in connection with the virtual network; and
      in response to confirming that the user credential corresponds to the reference credential, providing the customer entity with an authentication token that includes identification information that identifies:
         the customer entity; and
         a role of a user representing the customer entity;
   detecting an attempt by the customer entity to configure at least a portion of the virtual network via the customer portal by receiving, from the customer entity via the customer portal, the authentication token and a configuration request that identifies the portion of the virtual network to be configured;
   determining that the customer entity has authorization to configure the portion of the virtual network by:
      determining that the portion of the virtual network belongs to the customer entity identified by the authentication token; and
      determining that the role of the user representing the customer entity provides the user with authorization to configure the portion of the virtual network on behalf of the customer entity; and
   in response to detecting the attempt by the customer entity, performing a configuration operation that configures the portion of the virtual network as directed by the customer entity via the customer portal.

2. The method of claim 1, wherein:
   the network device of the service provider comprises a multi-tenant network device that directs network traffic of at least one other customer entity in addition to the network traffic of the customer entity; and
   performing the configuration operation comprises refraining from configuring any portion of the network device that is excluded from the virtual network.

3. The method of claim 1, further comprising:
   detecting an attempt by the customer entity to configure another portion of the network device of the service provider that directs network traffic of another customer entity;
   determining that the customer entity does not have authorization to configure the portion of the network device that directs network traffic of the other customer entity; and
   blocking the customer entity's attempt to configure the portion of the network device due at least in part to the customer entity not having authorization.

4. The method of claim 1, further comprising enabling the customer entity to delegate authorization to configure the virtual network to at least one user.

5. The method of claim 4, further comprising:
   detecting an attempt by the user to configure at least a portion of the virtual network on the network device via the customer portal;
   determining that the user has authorization delegated by the customer entity to configure the portion of the virtual network; and
   in response to determining that the user has authorization, performing a configuration operation that configures the portion of the virtual network as directed by the user via the customer portal.

6. The method of claim 1, wherein determining that the role of the user provides the user with authorization to configure the portion of the virtual network comprises:
   comparing the role of the user identified in the identification information included in the authentication token against an access control list of the virtual network; and
   determining, based at least in part on the comparison, that the access control list identifies the user's role as being authorized to configure the portion of the virtual network.

7. The method of claim 1, wherein the portion of the virtual network comprises at least one of:
   a Virtual Routing and Forwarding (VRF) instance;
   a portion of a networking operating system;
   a management daemon;
   a virtual network function manager;
   at least one routing instance; and
   at least one configlet of the network device.

8. A system comprising:
   a framework module, stored in memory, that provides a framework that enables a customer entity of a service provider to configure, via a customer portal, a network device of the service provider that directs network traffic of the customer entity;
   a virtualization module, stored in memory, that creates, for the customer entity by way of the framework, a virtual network that includes at least a portion of the network device of the service provider;
   an authentication module, stored in memory, that authenticates the customer entity by:
      obtaining at least one user credential from the customer entity via the customer portal;
      confirming that the user credential obtained from the customer entity corresponds to at least one reference credential stored in connection with the virtual network; and
      in response to confirming that the user credential corresponds to the reference credential, providing the customer entity with an authentication token that includes identification information that identifies:
         the customer entity; and
         a role of a user representing the customer entity;
   a portal module, stored in memory, that detects an attempt by the customer entity to configure at least a portion of the virtual network via the customer portal by receiving, from the customer entity via the customer portal, the authentication token and a configuration request that identifies the portion of the virtual network to be configured;
   a permissions module, stored in memory, that determines that the customer entity has authorization to configure the portion of the virtual network by:
      determining that the portion of the virtual network belongs to the customer entity identified by the authentication token; and determining that the role of the user representing the customer entity provides the user with authorization to configure the portion of the virtual network on behalf of the customer entity;

a configuration module, stored in memory, that performs, in response to the detection of the attempt by the customer entity, a configuration operation that configures the portion of the virtual network as directed by the customer entity via the customer portal; and at least one physical processor that executes the framework module, the virtualization module, the authentication module, the portal module, the permissions module, and the configuration module.

9. The system of claim 8, wherein:

the network device of the service provider comprises a multi-tenant network device that directs network traffic of at least one other customer entity in addition to the network traffic of the customer entity; and the configuration module refrains from configuring any portion of the network device that is excluded from the virtual network.

10. The system of claim 8, wherein the portal module detects an attempt by the customer entity to configure a portion of the network device of the service provider that directs network traffic of another customer entity;

further comprising a permissions module, stored in memory, that determines that the customer entity does not have authorization to configure the portion of the network device that directs network traffic of the other customer entity; and wherein:

the physical processor executes the permissions module; and the configuration module blocks the customer entity's attempt to configure the portion of the network device due at least in part to the customer entity not having authorization.

11. The system of claim 8, further comprising further comprising a permissions module, stored in memory, that enables the customer entity to delegate authorization to configure the virtual network to at least one user; and wherein the physical processor executes the permissions module.

12. The system of claim 11, wherein:

the portal module detects an attempt by the user to configure at least a portion of the virtual network on the network device via the customer portal;

the permissions module determine that the user has authorization delegated by the customer entity to configure the portion of the virtual network; and the configuration module performs, in response to the determination that the user has authorization, a configuration operation that configures the portion of the virtual network as directed by the user via the customer portal.

13. The system of claim 8, wherein the portion of the virtual network comprises at least one of:

a Virtual Routing and Forwarding (VRF) instance;

a portion of a networking operating system;

a management daemon;

a virtual network function manager;

at least one routing instance; and at least one configlet of the network device.

14. An apparatus comprising:

a storage device that stores a framework that enables a customer entity of a service provider to configure, via a customer portal, a network device of the service provider that directs network traffic of the customer entity;

at least one physical processor communicatively coupled to the storage device, wherein the physical processor:

creates, for the customer entity by way of the framework, a virtual network that includes at least a portion of the network device of the service provider;

authenticate the customer entity by:

obtaining at least one user credential from the customer entity via the customer portal;

confirming that the user credential obtained from the customer entity corresponds to at least one reference credential stored in connection with the virtual network; and in response to confirming that the user credential corresponds to the reference credential, providing the customer entity with an authentication token that includes identification information that identifies:

the customer entity; and a role of a user representing the customer entity;

detects an attempt by the customer entity to configure at least a portion of the virtual network via the customer portal by receiving, from the customer entity via the customer portal, the authentication token and a configuration request that identifies the portion of the virtual network to be configured;

determines that the customer entity has authorization to configure the portion of the virtual network by:

determining that the portion of the virtual network belongs to the customer entity identified by the authentication token; and determining that the role of the user representing the customer entity provides the user with authorization to configure the portion of the virtual network on behalf of the customer entity; and performs, in response to detecting the attempt by the customer entity, a configuration operation that configures the portion of the virtual network as directed by the customer entity via the customer portal.

* * * * *